United States Patent [19]

Shakshober

[11] 4,098,412
[45] Jul. 4, 1978

[54] PNEUMATIC OFFLOADING SYSTEM FOR TANKER

[75] Inventor: MacLean C. Shakshober, Chadds Ford, Pa.

[73] Assignee: Sun Shipbuilding & Dry Dock Company, Chester, Pa.

[21] Appl. No.: 731,275

[22] Filed: Oct. 12, 1976

[51] Int. Cl.² ............................................. B65G 53/16
[52] U.S. Cl. .................... 214/15 D; 214/14; 302/53
[58] Field of Search ................ 214/15 R, 15 B, 15 D, 214/14, 12; 302/42, 45, 51, 53, 57

[56] References Cited

U.S. PATENT DOCUMENTS 2,744,793  5/1956  McKinney ............................ 302/53

FOREIGN PATENT DOCUMENTS 107,234    8/1959  Denmark ........................... 214/15 B
1,020,566  2/1966  United Kingdom .................. 214/14
288,652    8/1971  U.S.S.R. ............................... 302/53

Primary Examiner—Drayton E. Hoffman
Assistant Examiner—George F. Abraham
Attorney, Agent, or Firm—J. Edward Hess; Donald R. Johnson; Paul Lipsitz

[57] ABSTRACT

A system for offloading granular materials from a tanker designed to carry oil. The tanker includes pressurized holds for oil and a blower system coupled to the pressurized holds. The pressurized nature of the holds and the blower system already existing on, or added to, the ship are utilized to unload granular materials from the holds. In one embodiment, two concentric pipes extend through one or more Butterworth openings in the top of each hold. The outer pipe has several openings in it near the top of the hold. When the ship blower system is turned on, air is pumped into the hold, through the openings in the outer pipe, down the outer pipe to a discharge end near the bottom of the hold, into the granular material which it entrains, and then up the inner concentric pipe out of the pressurized hold. In another embodiment, air is pumped down one leg of a U shaped pipe to the bottom where granular material is entrained by the air, and is pumped up the second leg of the pipe and out of the hold.

6 Claims, 2 Drawing Figures

PNEUMATIC OFFLOADING SYSTEM FOR TANKER

BACKGROUND OF THE INVENTION

The present invention relates generally to a system for unloading granular materials from a ship, and more particularly pertains to a system for unloading grandular materials from an oil tanker which has been put into service carrying granular materials.

Present political and economic situations around the world have resulted in a surplusage of oil tankers. Concurrently there has been a rising demand for shipment of wheat to various areas of the world. In view of the surplusage of oil tankers and the demand for shipment of wheat, it would be desirable to be able to transport wheat in vessels designed for the carriage of oil. Oil tankers may be readily loaded with a wheat cargo, but there is a problem with unloading the wheat. A vessel designed for the carriage of granular materials such as wheat typically has large hatches through which conveyor equipment may gain access to the wheat cargo. This enables a rapid and efficient unloading of the cargo. Unfortunately, oil tankers do not have sufficiently wide hatches to allow such conveyor equipment access to the holds.

One method used in the prior art to unload wheat from an oil tanker has utilized VACUVATOR equipment, which is in the nature of a giant vacuum cleaner. This equipment is introduced into the oil tanker holds through existing hatches, and the wheat is vacuumed out of the hold during offloading. A problem with this approach is that it is too time consuming, and with this approach three to four weeks may be required to unload a large oil tanker.

Present oil tankers are built with some unique structure, some of which is taken advantage of by the present invention. Many oil tankers are designed to be pressurized, and as a safety factor, the top of each hold is designed to support eight feet of water in the event of waves breaking across the ship. Many oil tankers also include large blowers which are connected to each hold by pipes, and are utilized during several types of operations on an oil tanker. After the holds are filled with oil, the blowers are utilized to fill the remaining spaces in the holds with boiler flue gas, an inert gas, to minimize the possibility of combustion in the holds. After unloading, the blowers are also utilized to flush residual gases out of the holds.

SUMMARY OF THE INVENTION

In accordance with a preferred embodiment, a system is disclosed for removing granular materials from a pressurized hold in a tanker and further having a source of pressurized gas coupled to the pressurized hold. In the preferred embodiment, a discharge pipe for transporting granular materials out of the hold has a discharge end outside the hold and a pickup end in the hold. A pressurized gas pipe, coupled to the pressurized gas, has a discharge end adjacent to the pickup end of the discharge pipe. The pressurized gas pipe transports pressurized gas to its discharge end adjacent to the pickup end of the discharge pipe where it flows into and entrains the granular material and then transports it through the discharge pipe out of the pressurized hold. Further, in the preferred embodiment the discharge and pressurized gas pipes are concentric pipes. Also, in the preferred embodiment the discharge pipe is the inner concentric pipe, and the pipes extend down to near the bottom of the hold with one pipe end being positioned at a slightly different height above the bottom of the hold then the other pipe end. Further, in the preferred embodiment a source of pressurized gas already coupled to the hold exists on the tanker, and the presurized gas pipe has openings near the top of the hold to pick up the pressurized gas and transport it to its discharge end.

DESCRIPTION OF A PREFERRED EMBODIMENT

Figure 1:
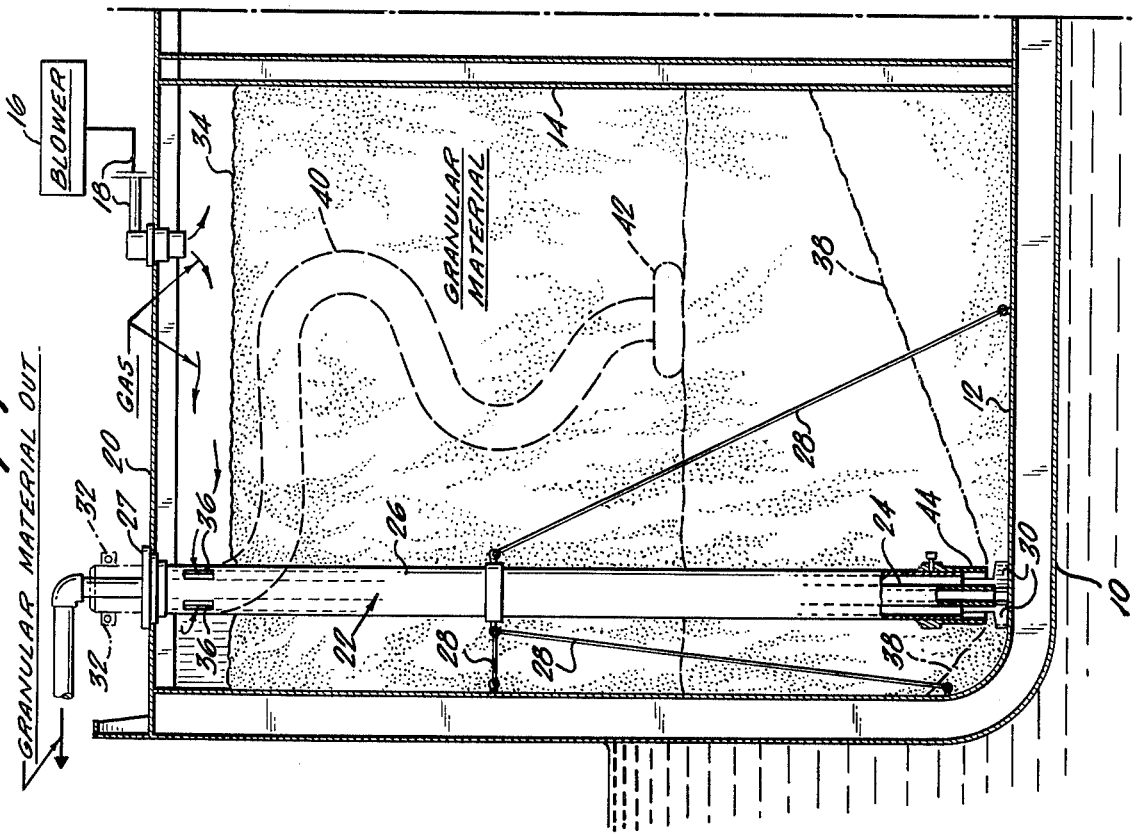
FIG. 1 illustrates two embodiments of the present invention.

Referring to FIG. 1, there is illustrated a cross section of a typical hold on a oil tanker having several such holds. The hull of the oil tanker has a double wall construction 10 and 12 to minimize the danger of an oil spill in the event of an accident. A central partition 14 separates the left and right halves of the tanker and the different holds from one another. An oil tanker typically has a diesel driven blower system, illustrated schematically at 16. These blowers have access to the different holds in the ship through pipes 18, one of which is shown. The blower system serves several different functions. It may be used to vent a hold after it has been emptied of its oil cargo. Further, after a hold has been filled with oil, the blower system may be utilized to pump boiler flue gas, an inert gas, into the remaining portion of the hold to minimize the possibility of combustion. The upper deck 20, which forms the top of the hold, typically has a number of sealable openings therein which serve various functions on an oil tanker. These include a 48-inch hatch through which a person might gain access to the hold and a number of 12-inch diameter Butterworth openings. One or more of these Butterworth openings is used in the disclosed embodiment. Concentric pipes 22, including an inner discharge pipe 24 and a outer pressurized gas pipe 26, extend through a Butterworth opening 27 which is sealed around the pipe/s to maintain the pressurized nature of the hold. The concentric pipes may be held in place by a plurality of cables 28. The concentric pipes extend down to near the bottom of the hold where they rest upon several vertically positioned plates 30 which hold them in position. Although both concentric pipes are shown extending through the Butterworth opening in the upper deck, in some embodiments the outer pipe might terminate just below the upper deck, which is why the portion of that pipe extending above the deck is shown in dashed lines. That portion also has several ears 32 with holes therein to facilitate handling, as by a crane, of the pipes.

It is believed that the easiest way to explain this invention would be to explain a cycle of operation. Assume that the hold is loaded with grain to a level 34 and offloading is desired. The blower 16 would be turned on to pressurize the hold. Gas would be pumped through pipe 18 into the hold, and would enter the outer pipe 26 through a plurality of apertures 36 around the circumference of the top of the outer pipe. The gas would flow down the pipe 26 to its bottom discharge end, and would then impact upon grain in the hold, entrain it, and the grain/air mixture would then be pumped out the inner pipe 24 to some suitable container such as a hopper. The grain would be offloaded in this manner until it were depleted down to some level at a given angle of repose, shown schematically by dashed lines 38. At this time, offloading would have to be accomplished in some other manner. For instance, workers might shovel the granular material adjacent to the concentric pipes to assist in the operation of the system, or vacuum equipment might be utilized, or the grain might simply be shoveled into containers. Alternatively, the concentric pipe might branch out into several legs, each having a valve therein, extending into the various corners of the hold. Each leg might have its valve opened in turn as the corners of the hold are offloaded of the granular material.

In one alternative embodiment illustrated in dashed lines in FIG. 1, the concentric pipes 40 might be flexible, and terminate in a supporting end 42, which may be thought of as an inner tube which supports the pipe on top of the grain. With this embodiment, the end 42 may be moved about to different positions on the bottom of the hold as the offloading is being completed, and accordingly this embodiment offers some advantage in this respect over the embodiment shown in solid lines.

As shown in FIG. 1, the inner pipe 24 may extend slightly below the outer pipe 26 at the bottom. A test on one model of the present invention utilizing grain as the granular material resulted in maximum grain/air ratios and grain discharge rates when the inner pipe extended below the outer pipe by approximately one fifth the diameter of the inner pipe. The configuration at the bottom of the concentric pipes might depend upon many factors such as air flow rates and the type of granular material being unloaded. A movable sleeve 44 might be mounted on one of the pipes to accommodate different offloading situations.

One problem which might be encountered with the present invention is the settling of the granular material at the bottom of the concentric pipes during transportation. This settling might cause a plug to form at the bottom of the concentric pipes, whereby gas would be prevented from flowing through the pipes. Settling, if it turns out to be a problem, might be compensated for in several ways. The concentric pipes 22 might be designed to be removable from the hold by ears 32, in which case they would be placed therein only during offloading. Alternatively, air jets might be arranged around the bottom periphery of the concentric pipes to unsettle any plug which had formed therein. Also, a plate having a matrix of holes therein could be positioned below the ends of the pipes to force air up through the grain to loosen the plug sufficiently to allow the grain to start flowing through the system.

Figure 2:
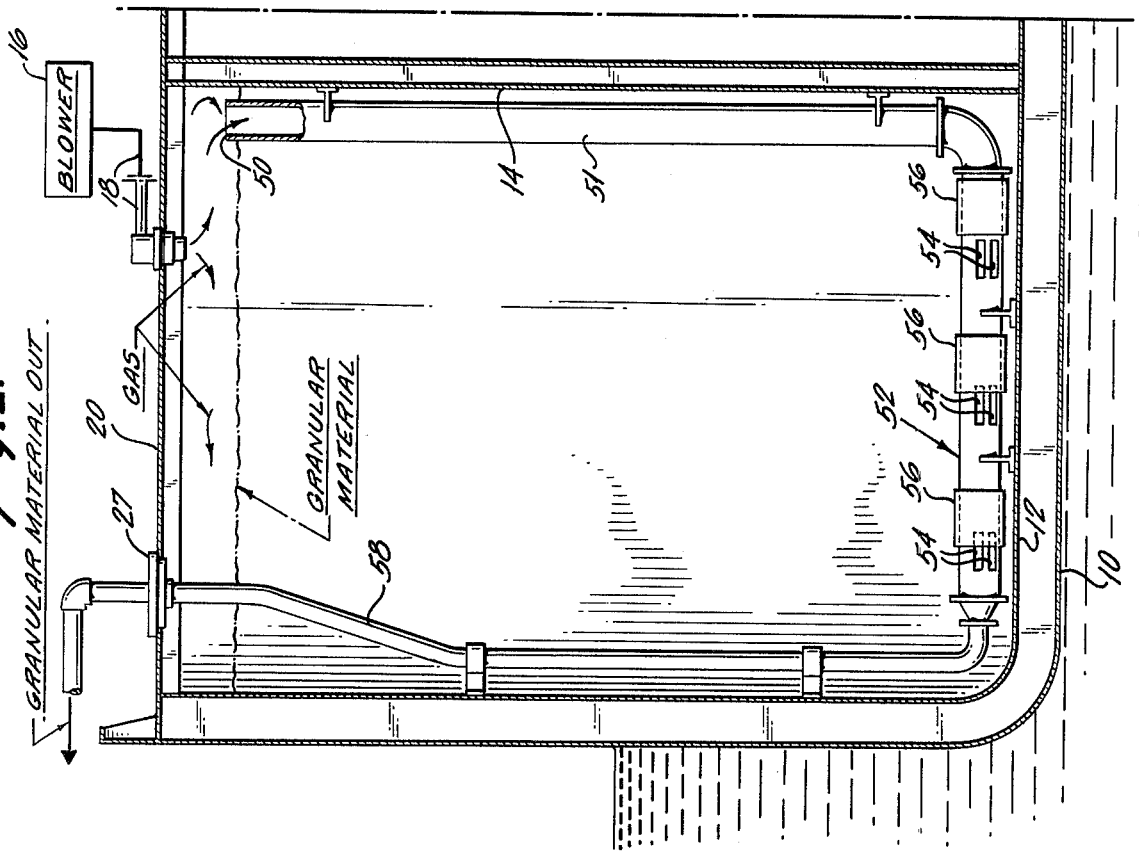
FIG. 2 illustrates a third embodiment of the present invention.

FIG. 2 illustrates a third embodiment of the present invention. In that embodiment, the two concentric pipes have been replaced by one U shaped pipe. Gas is pumped through an open end 50 of the U shaped pipe and down one leg 51 thereof to the bottom 52. The bottom 52 has a number of apertures 54 therein to allow entry of granular material into the pipe. The granular material which enters the pipe is entrained by the presurized gas and pumped up leg 58 out of the hold. Although only one aperture is illustrated at each end and in the middle of the bottom of the pipe 52, each location may have several apertures around the circumference of the pipe. Each aperture has a slidable cylindrical sleeve 56 located adjacent to it which may be positioned to either cover or uncover the aperture. In operation, near the end of an offloading operation, the apertures 54 at the left and right ends of the bottom may be opened, one at a time, to empty the granular material from the left and right portions of the hold. Alternatively, the apetures may be sized such that all of the apertures may be open at once, whereby offloading of the grain would take place simultaneously through all of the apertures. In this embodiment, the right leg 51 serves as the pressurized gas pipe, the left leg 58 serves as the discharge pipe and the bottom leg 52 serves as the pickup section.

In designing various embodiments of the present invention, the size of the pipes would depend upon the capacity of the blower system, and would be chosen to obtain a given velocity of gas through the system. With an oil tanker having a blower system 16 with 20,000 cubic feet per minute (CFM) capacity, it is aticipated that aproximately 12,000 tons of grain per day could be unloaded. This compares with an unloading rate of about 4,000 tons per day with VACUVATOR equipment. This means that a tanker having slightly less than 100,000 tons capacity of grain could be unloaded in approximately 8 days, as compared with 24 days for VACUVATOR equipment. This would result in a saving of ship time of 16 days, which means that the utilization of the present invention on board an oil tanker could have a significant economic impact upon the operation of the tanker.

In some embodiments of the present invention it might be desired, if economically feasible, to augment the blower system already on the tanker with additional blowers, which would result in a faster unloading rate. The term granular materials has been used herein and it should be understood that this term has been selected as a generic term for all types of materials (such as powders) to which the teachings of the present invention may be applicable. Also, the illustrated embodiment has been explained with reference to offloading a tanker. However, the teachings of the present invention are also applicable to other functions such as the movement of granular materials from one hold to another. Although at least one embodiment of the present invention has been described, the teachings of this invention will suggest many other embodiments to those skilled in the art.

The invention claimed is:

1. A system for removing granular material such as wheat from a pressurized hold in a tanker which consists of:
   (a) a single input source of pressurized gas coupled to the pressurized hold near its top;
   (b) a continuous pipe for transporting granular materials out of the pressurized hold said pipe having a discharge end outside the presurized hold and a pickup section near the bottom of the pressurized hold;
   (c) a pressurized gas pipe concentric with said discharge pipe, coupled to the pressurized gas, for transporting pressurized gas to the pickup section of the discharge pipe where the pressurized gas will flow into and entrain the granular material and transport it out of the pressurized hold through the discharge pipe, whereby the pressurized hold of the tanker is advantageously utilized to remove granular materials from the hold.

2. A system as set forth in claim 1 wherein said discharge pipe is the inner concentric pipe.

3. A system as set forth in claim 1 wherein said discharge pipe enters the pressurized hold through a Butterworth opening already existing at the top of the pressurized hold, and wherein the system includes means for sealing around the discharge pipe at the Butterworth opening.

4. A system as set forth in claim 1 wherein the source of pressurized gas already exists on the tanker and discharges gas in the pressurized hold, and wherein said pressurized gas pipe has at least one aperture located near the top of the pressurized hold for allowing pressurized gas to flow into the pressurized gas pipe.

5. A system as set forth in claim 4 wherein said discharge pipe is the inner concentric pipe.

6. A system as set forth in claim 5 wherein said discharge pipe enters the pressurized hold through a Butterworth opening already existing at the top of the pressurized hold and wherein the system includes means for sealing around the discharge pipe at the Butterworth opening.

* * * * *